United States Patent [19]

Chupka et al.

[11] Patent Number: 5,064,537
[45] Date of Patent: * Nov. 12, 1991

[54] SEAMLESS SCREEN CYLINDER WITH LASER CUT OPENINGS

[75] Inventors: David E. Chupka, Middletown; Joseph P. Constiner, Monroe; Christopher M. Vitori, Middletown, all of Ohio

[73] Assignee: The Black Clawson Company, Middletown, Ohio

[*] Notice: The portion of the term of this patent subsequent to Jan. 31, 2006 has been disclaimed.

[21] Appl. No.: 450,873

[22] Filed: Dec. 14, 1989

Related U.S. Application Data

[60] Continuation-in-part of Ser. No. 176,500, Apr. 1, 1988, Pat. No. 4,901,417, which is a division of Ser. No. 81,771, Aug. 5, 1987, Pat. No. 4,795,560, which is a continuation-in-part of Ser. No. 39,391, Apr. 16, 1987, abandoned.

[51] Int. Cl.$^5$ .................. B01D 39/10; B23P 15/16
[52] U.S. Cl. ................. 210/497.01; 29/163.8; 162/251; 209/270; 209/273; 209/306; 209/397; 210/415; 210/498; 219/121.67
[58] Field of Search ............ 29/163.8; 219/121.67, 219/121.72; 210/415, 498, 497.01; 162/251; 209/270, 273, 306, 397

[56] References Cited

U.S. PATENT DOCUMENTS

| Re. 31,482 | 1/1984 | Noble | 164/114 |
| 3,293,708 | 12/1966 | Fruitman | 22/200.5 |
| 4,017,387 | 4/1977 | Hatton et al. | 209/240 |
| 4,317,023 | 2/1982 | Gryskiewicz | 29/163.8 |
| 4,795,560 | 1/1989 | Chupka et al. | 210/415 |
| 4,818,840 | 4/1989 | Booth | 219/121.72 |
| 4,885,090 | 12/1989 | Chupka et al. | 210/415 |
| 4,901,417 | 2/1990 | Chupka et al. | 29/163.8 |

FOREIGN PATENT DOCUMENTS

725601 3/1955 United Kingdom.

OTHER PUBLICATIONS

Kaiser Aerospace & Electronics Company, "Seamless Precision Cylindrical Shapes by the Roll Extrusion Process" (undated).

Primary Examiner—W. Gary Jones
Attorney, Agent, or Firm—Biebel & French

[57] ABSTRACT

Screen cylinders, and methods of making the same for use in removing contaminant particles from papermaking stock, have a seamless cylinder body and the openings or slots therethrough are formed by directing a focused laser beam at an outer surface while focusing the beam intermediate the outer an dinner surfaces to form an opening or slot with tapered walls. Wear bars may be applied to the inside surface as a bead of weld material. The seamless cylindrical body is formed by centrifugal casting or by cold roller extrusion.

9 Claims, 3 Drawing Sheets

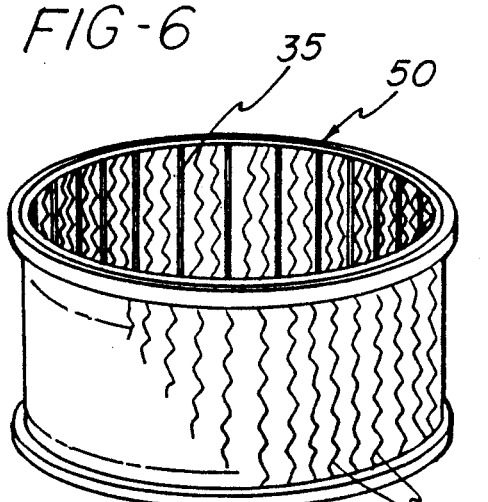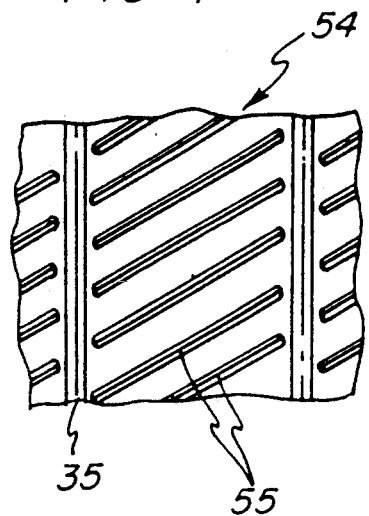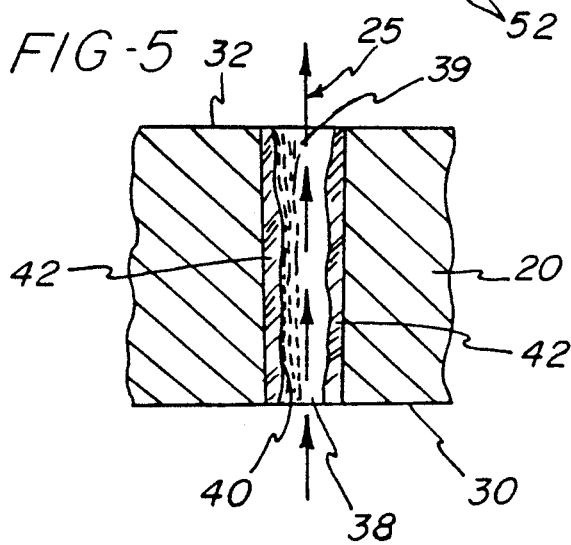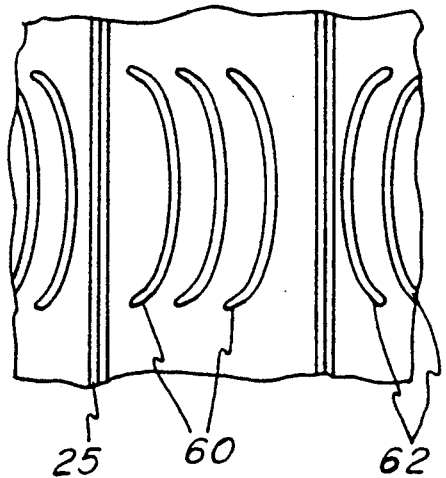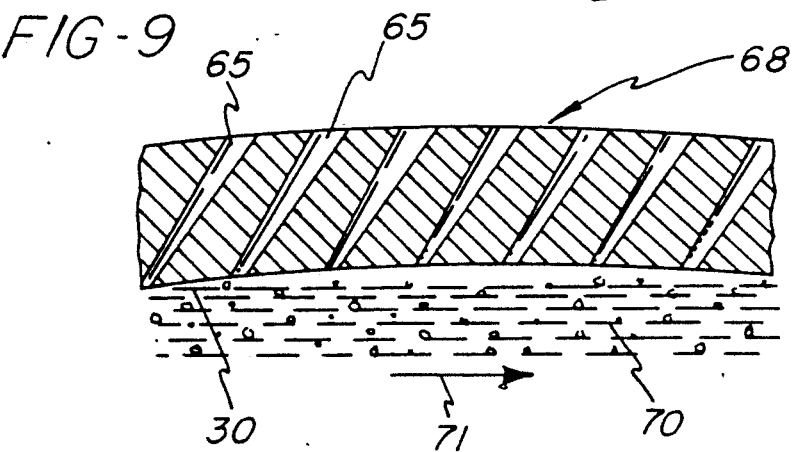

SEAMLESS SCREEN CYLINDER WITH LASER CUT OPENINGS

RELATED APPLICATION

This application is a continuation-in-part of application Ser. No. 176,500 filed Apr. 1, 1988, now U.S. Pat. No. 4,901,417, which is a division of application Ser. No. 081,771 filed Aug. 5, 1987, now U.S. Pat. No. 4,795,560 issued Jan. 3, 1989, which is a continuation-in-part of Ser. No. 039,391 filed Apr. 16, 1987, abandoned.

BACKGROUND OF THE INVENTION

This invention relates to screens or screen cylinders more particularly to screens which are used in pressure screening apparatus for removing contaminant particles from papermakers' stock.

High turbulence pressure screening apparatus of the kind shown, for example, in U.S. Pat. No. 4,155,841 issued May 22, 1979 to Chupka and Seifert, and assigned to the same assignee as this invention, is used in the preparation of papermaking stock. A suspension of liquid and paper fibers, which may in varying degrees contain undesirable rejects or contaminate particles, is supplied to the inlet of the apparatus as disclosed, for example, in the '841 patent, where it is applied to an annular cylindrically shaped screen having specifically designed slots or perforations therethrough. Typically, the paper stock is fed to the interior of a vertically oriented cylindrical screen, and the rejects are withdrawn from one end of such a screen, while the accepts pass through the slots or perforations in the screen and are collected at a location outwardly of the screen. Rotating foils or vanes are positioned usually on or adjacent the inside of the screen surface, in close relation to the surface, to reduce the plugging of the screen slots or holes.

Typically, the screen cylinder of the kind described above is formed by machining the required slots or grooves in a flat plate of metal material, such as stainless steel, and then by rolling the material into the shape of a cylinder, and welding the rolled plate at the abutting ends to form a welded seam. Thereafter end rings, formed from bar stock, are rolled, welded at their respective ends, and then attached by welding to the cylinder plate, at its respective ends. Further, one or more intermediate reinforcing rings, also formed from rolled bar stock, are attached by welding at longitudinally spaced locations on the outer surface of the rolled screen plate. An example of such a fabricated cylinder screen is shown in Hatton et al, U.S. Pat. No. 4,017,387, issued Apr. 12, 1977 and assigned to the same assignee as this application.

As described in Hatton et al, such cylinders are subject to fatigue failures. The fatigue failures are believed to be induced principally by the dynamic pulse pressures of the rotating foils usually carried by a rotor assembly and positioned to run in close relation to the inside surface of the cylinder. These foils, which may rotate at speeds at 5000 ft. per minute or more create, in the cylinder, a moving positive pressure wave along the inside face followed by a relatively negative pressure behind the foils.

At least two foils are employed with the result that the screen is subject to a radial outward bending at a number of rotationally moving axially extending locations, followed by forces forming an inward bending or negative pressure at the intermediate locations. The positive and negative pressures may be considered as placing the material alternately in compression and tension.

The stress condition, described above and also described in Hatton et al, is exacerbated by the fact that all of the components making up the screen cylinder originally began as longitudinally flat components which were rolled and welded to a cylindrical form and in many cases to each other. The rolling process inherently creates, in any such flat bar or plate material, a condition of compression on an inside diameter and tension at an outside diameter. While, in the manufacture of such cylinders, steps are taken to relieve such stresses, nevertheless it is believed the stresses cannot be fully relieved while maintaining adequate hardness and desired crystal structure of the metal, and it is believed that residual stresses are inherently retained in the finished screen cylinders.

Further complications reside in the fact that openings, in the form of holes, relieved areas, or slots, are cut or formed in the sidewall plate while in the flat condition, and become inherently distorted by the rolling process. Further, since a large number of slots are formed in closely spaced relation, each usually terminating at common positions on the plate to form rows of such slots separated by land areas, the rolling process is inherently nonuniform circumferentially of the plate due to the differences in strengths between a slotted and a non-slotted region. It is accordingly believed that stress concentration points tend to be formed at the terminal ends of the slots during rolling due to differential bending at these locations.

The welding along the plate seam and along the end rings and the intermediate rings inherently creates lines of weakness where a weld may not be as strong as the original material. Also such a weld will commonly exhibit a lower tolerance to fatigue cycles than the basic material. In any case, catastrophic failure of such screen cylinders in service are most commonly found associated with one or more of the welds such as at a welded seam or at a ring. Further, a high percentage of failure modes include fatigue cracks which extend from or to an end of a slot defining a point or region of stress concentration.

For some time, in order to reduce fatigue failures at conventional weld joints, electron beam welding techniques have been used to attach the reinforcing rings to the outer cylinder bodies. While this technique has somewhat reduced the instances of weld failures at the reinforcing rings, the weld itself is particularly difficult to inspect for integrity, and a number of failures have been attributed to imperfect joining of the adjacent parts by the electron beam.

A need therefore exists for a screen cylinder, and a method of manufacturing the same which eliminates the source of catastrophic breakage and premature fatigue-induced failures in cylinder screens.

The most costly and time consuming step in the manufacture of the screen cylinder is that of the cutting of the slots or openings in the side wall. Since this is commonly performed in the flat plate material, prior to rolling, the exact nature of the slotted pattern, including the extent of openness and the width and dimension of the slots or openings for any particular screen must be known prior to fabrication. Such plates have been damaged during the rolling process, thus resulting in the scrapping of a valuable piece. Further, fabrication by rolling and welding of the individual components inherently produces a cylinder which is not truly cylindrical, but will usually have a run out of as much as 0.125 inches in 24 inches of diameter. Such out-of-round condition not only complicates fabrication, it also adversely impacts upon the clearance which must be provided between the foil and the closest inside surface.

The practice of cutting the wall of the plate prior to rolling makes prohibitively costly the warehousing or stocking of any large quantity of pre-manufactured cylinders, and generally a cylinder is made only after receiving a specific order for the same.

SUMMARY OF THE INVENTION

This invention is directed to a screening cylinder and method of making the same, in which an integral seamless cylinder body is formed essentially free of stress and free of welded connections, and is thereafter slotted or cut by laser cutting to form the screening openings therethrough. Two methods or embodiments of making the cylinder body, prior to laser cutting, are disclosed. The first employs a centrifugally cast body, which is initially cast essentially to the desired finished shape. Centrifugal casting techniques have long been known to provide a product having superior uniformity of grain structure and superior dimensional tolerance as to roundness, in cylindrical metal parts. Where end rings and/or intermediate reinforcing rings or ribs are required, they may be cast in place during the centrifugal casting. After casting, the cast part may be machined to a high degree of accuracy about a true center, and thereby provides a seamless body which is inherently free of internal stresses, and has a uniform and coherent grain structure.

The invention also includes an alternative method of making the seamless basic body or cylinder, by cold working a seamless blank using the roller extrusion process. The end rings and/or intermediate reinforcing rings or ribs are desired, they may be formed during the cold working. The starting workpiece may be a centrifugal casting. After casting, the piece is cold worked by the roller extrusion process, as practiced as a proprietary process by Kaiser Rollmet Division of Kaiser Aerospace & Electronics Company, 1822 Deer Avenue, Irvine, Calif. Such a cold worked screen is seamless and is characterized by a higher strength as compared to an "as cast" material.

The proprietary "Rollmet" process provides a precision seamless cylindrical shape which is uniquely suited for the production of thin walled and complex cylindrical shapes in diameters from 4 inches up to 72 inches. Most deformable metals are suited to this radial forging process, including matrix and composites, stainless steels, titaniums, and many other workable metals. Extremely high tolerances and accuracies are obtainable, and end rings, as well as intermediate rings, can be formed during the process.

The proprietary process results in a fine grain structure which results from the combination of cold working of the metal plus re-crystallization and work hardening. The work piece can therefore be a blank cylinder of required specifications with respect to wall thickness and length, taking into the account the radial and axial expansion inherent in the radial forging process to arrive at a desired wall thickness and axial length in the finished product, as is known in this art.

Two methods of radial forging are available. One involves an internal roll extrusion in which the blank or work piece is placed inside a rotating one piece cylindrical die ring, and rollers inside the blank are displaced radially outwardly while the tube outside diameter remains confined and constant, thereby providing a high accuracy thin wall. This is a preferred process. An alternative process is available by which outside rollers operate in conjunction with a mandrel so that as the blank is rotated and pulled through the rollers, the I.D. remains constant while the wall thickness and the O.D. is reduced. In either technique, a truly cylindrical wall is formed to accurate dimensions and is simultaneously cold worked to increase the strength over its "as cast" condition.

Either centrifugal coasting or roller extrusion techniques have not, to our knowledge, heretofore been considered as a viable alterative in the manufacture of such screen cylinders due to the extreme difficulty of machining the required slots in a cylinder-shaped wall. In the present invention, the openings or slots, as the case may be, are formed by a laser cutting technique, by focusing a laser cutting beam or by directing such laser beam energy, at the outlet surface toward the inlet surface. Preferably, a focused beam is directed through the outlet surface and is focused in the wall at a region which is adjacent or immediately inward of the inlet surface, with respect to the thickness of the wall.

To make a slot, the cylinder and/or the beam may be moved in relation to the other. The high degree of accuracy of the roundness or trueness of the centrifugal cast product permits the laser cutting head to be positioned in close relation to the outer surface to be cut while one or the other is moved. The need to program for an out-of-round condition is reduced or eliminated.

The laser cutting of openings, such as slots, does not inherently create any additional stress concentration points in the cylinder. Since the body is substantially free of stresses, and free of welded connections, the perceived failure modes are reduced, with the expectation of longer life or fewer catastrophic failures. Such a cylinder will inherently absorb a larger number of flex cycles before exhibiting induced fatigue failures.

If desired, turbulence inducing bars, also know as "wear" bars, may be applied along the inside surface of the cylinder, either before or after laser cutting. In many instances it has been found to be worthwhile to add such bars to the surface rather than remove material from the screen to produce a contour. Preferably the wear bars are formed by laying down one or more beads of weld material in a line on the surface to form an axially extending bar. The application of wear bars to the body by welding a surface bead is not believed to create any inherent weakness since the weld does not excessively penetrate the thickness of the wall material, and since the wear bars themselves do not carry a load. The enhancement of paper stock screening by employing wear bars on such inside surface has been well documented, such as described in U.S. Pat. No. 4,155,841, previously mentioned.

The method and screen cylinder of this invention permits the stocking of unslotted or bleed bodies for subsequent custom cutting as the need arises. The risk of economic loss due to damage in the rolling and subsequent welding operation is avoided.

The roller extrusion cold work process or the centrifugal casting process permits the formation of screen cylinder bodies of more than one material. For example, the main portion of such a body may be formed of basic stainless steel, and an inside wear surface of a harder or more wear resistant material may be used. In casting, the harder inside material is added after the body is cast of the basic material.

The laser cutting of the openings or slots, as the case may be, is simplified by not having to program for out-of-round conditions. For example, centrifugally cast screens may now be as true as two-thousands of an inch or closer, at a 24 inch diameter. Further, it is no longer necessary to program for the change in dimension of the slots as the part is rolled and therefore the slots may be initially made directly to the finished shape.

It has also been found that the laser metal cutting technique as applied to screen plates as disclosed and described herein, results in plates having new and unobvious properties, permits a higher percent of open area, and enables a greater percent of metal to remain in the plate for strengthening the plate. It also provides openings or slots which have a minimum relief, promotes the use of substantially harder metals or materials, and provides openings which are true and substantially square at the respective surface interfaces.

Another and unexpected advantage of the invention is that the use of laser cutting of the cast screen results in the formation of opening walls which are very smooth or "glassy" in appearance by reason of the fact that the immediate material of the wall has been momentarily melted and recast followed by rapid cooling. Although the walls themselves may undulate slightly, as compared to a tool-cut wall, such surface undulations do not detract from the effectiveness of the screen cylinder. In fact, the molten and recast surfaces which are presented to the stock at the walls materially aid in the reduction of friction and the flow of stock through the plate.

The methods of this invention permit the formation of complex hole or slot designs, such as curved, inclined chevron or zig-zag patterns, as may be desired to enhance the performance of the screen or provide a distinctive slot pattern. A particularly advantageous result is that the openings may be conveniently inclined relatively either with or against to the direction of flow of the stock within the cylinder. The inclination of an opening or slot in alignment with or parallel to the direction of flow has the effect of enhancing the flow of stock through the slots or openings by reducing to a substantial extent the angle through which the rotating or swirling stock must turn.

Inclining the openings or slots in a direction contrary or acute to the flow vector of the stock thereby causes the longer rejects to turn through a greater angle to enter the opening. The inclination of the slots or openings contrary to, or forming an acute angle with, the flow vector of the stock within the screen serves to reject heavier particles such as cubicle particles, bits of sand, bark, dirt, and also to reject longer pieces of fiber, plastics and other debris, thereby providing a higher degree of cleanliness downstream of the screen and a correspondingly higher percentage of rejects upstream of the screen. Further, it is within the scope of the invention to provide a compound screen in which the screen is characterized by openings or slots which extend in varying angles through the plate, and which at the same time are formed in one or more distinctive patterns, groupings, or configurations.

A seamless screen cylinder product and process are thus achieved in which individual, closely spaced openings, such as slots, are formed extending from an inlet surface to an outlet surface, which openings are substantially free of relief and have a minimum of taper, and provide inlet gaps or openings at a desired width with true and sharp edges at the intersections of the openings with the inlet and outlet surfaces. The minimum relief which is achieved preserves a substantial amount of material in the plate which that otherwise be removed by conventional drilling, routing or slot cutting techniques, and provides a cylinder which has greater strength than corresponding plates having the same percent of open area and, alternatively, promote the design of thinner walls than previously possible.

Additionally, since the technique of laser cutting is relatively insensitive to the hardness of the material being cut, materials such as extreme hardness steel alloys can be used for the cylinders and economically machined to reduce the rate of wear, and thereby extend the effective life of the screen.

It is accordingly the principal object of this invention to provide a seamless screen cylinder and method of making the same in which an integral screen cylinder body is formed by centrifugal casting or by roller extrusion, and in which the openings or holes therethrough are formed by laser cutting or laser machining.

Another object of the invention is the provision of a unitary screen cylinder, as outlined above, essentially free of stresses and exhibiting a reduced tendency for fatigue-type failures in use.

Another object of this invention is the provision of the method of making such a screen, in which a plurality of openings or slots are cut by laser machining to provide passage with a minimum of taper and a plate with a maximum of open area for the amount of metal removed.

Another object of the invention is the provision of a screen and method of making a screen in which the wear or interrupter bars are applied as beads of weld material.

A further object of the invention is the provision of a screen for paper stock and a method of making the same, that provides for the use of material which is substantially harder than can be used with conventional methods of machining the slots or openings therethrough, and which is therefore less subject to wear over long periods of use with abrasive stock materials.

A further object of the invention is the provision of a screen and method of making the same, in which the screen openings or slots are inclined to either the axis of the cylinder, or radius or both.

A further important object of the invention is the provision of a screen, and method of making the same, in which openings or slots are formed in irregular or regular curved, zig-zag or wavy patterns, or combinations of the same, and also in which the defined openings extend through the screen at an angle or angles other than normal to the surfaces.

A particular object and advantage of this invention is the provision of a screen in which the body is formed as an integral piece and walls of the openings therethrough are free of conventional tool or machine marks. The openings or sheet walls are characterized by a surface which has been momentarily molten and recast by rapid chilling to provide a "glassy" like appearance, and forms an extremely hard and friction free surface for the passage of stock therethrough, for enhancing the efficiency of the screen plate.

Another object of the invention is the provision of a screen cylinder for the screening of papermaking stock having a unitary cast and/or work hardened body which may be stocked or warehoused prior to customized cutting, and which is laser cut in the cylindrical form, and which is free of internal bend stresses and mechanical weld connections.

DESCRIPTION OF ACCOMPANYING DRAWINGS

FIG. 5 is an enlarged sectional view through one of the slots;

FIG. 6 is a somewhat diagrammatic view of a screen cylinder according to this invention showing a chevron slot arrangement;

FIG. 7 is an enlarged inside elevational view showing another slot arrangement;

FIG. 8 is a view similar to FIG. 7 showing a still different arrangement of slots; and FIG. 9 is an enlarged fragmentary section of the wall of the cylinder showing the formation of inclined holes or slots slopping with the direction of movement of the stock.

DETAILED DESCRIPTION OF PREFERRED EMBODIMENTS

Figure 1:
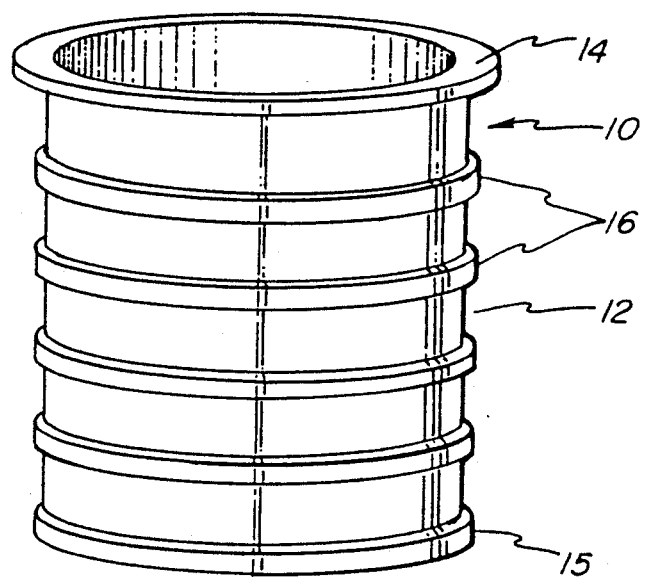
FIG. 1 is a perspective view of a body of a screen cylinder which has been made either by centrifugal casting or by cold roller extrusion.

Referring to the drawings, and particularly to FIG. 1, a body 10 of a screening cylinder body 10 is shown as made according to this invention. As previously noted, the body 10 may be a finished centrifugal casting, which is cast initially to the desired size and which may have a finished or machined inner and/or outer surface as required. Such an "as cast" blank is inherently free of internal stresses and is characterized by a uniform grain pattern throughout. The blank is entirely seamless, and free of any welds which could form high stress points or points of weakness. The techniques for centrifugally casting of cylindrical bodies are well known in the art, and reference may be had to U.S. Pat. Nos. 2,843,755, 4,124,056, 3,293,708, and 743,077. Either vertical or horizontal centrifugal casting techniques may be used as well known in the industry.

Alternatively, the body 10 may be cold worked, also as previously mentioned. Preferably, a centrifugal cast blank is employed, in the shape of a simple cylinder, with a controlled inside or outside diameter, and is radially cold worked by inside roller pressure against an outside mandrel or outside roller pressure against an inside mandrel, as known as the "Roll Extrusion" process practiced by Kaiser Rollmet Division, Kaiser Aerospace & Electronics Company, 1822 Deer Avenue, Irvine, Calif. In either process, a central or intermediate cylindrical screening portion 12 of defined thickness is formed with accurately spaced inner and outer surfaces.

If desired, in either process, a first integral end ring 14 may be formed on one end and a second integral end ring 15 is formed on the opposite axial end thereof, as may be required for utilization in the particular screening apparatus. The body 10, during forming, may also be provided with one or more intermediate enforcing rings 16.

Where the entire body 10 is centrifugally cast to the finished size, after casting it may be surface finished, at least on the inside surface, by a machine tool to remove any residual slag and/or irregularities, and to provide a cylindrically true surface along the inside surface. The end rings 14 and 15, as well as the intermediate rings 16 are not separate or discrete elements, such as shown in U.S. Pat. No. 4,017,387, previously mentioned, but rather are unitary and integral parts of the body 10 itself, and thus are integral with the intermediate cylindrical portion 12 and the generally cylindrical side wall defined by this section.

Figure 2:
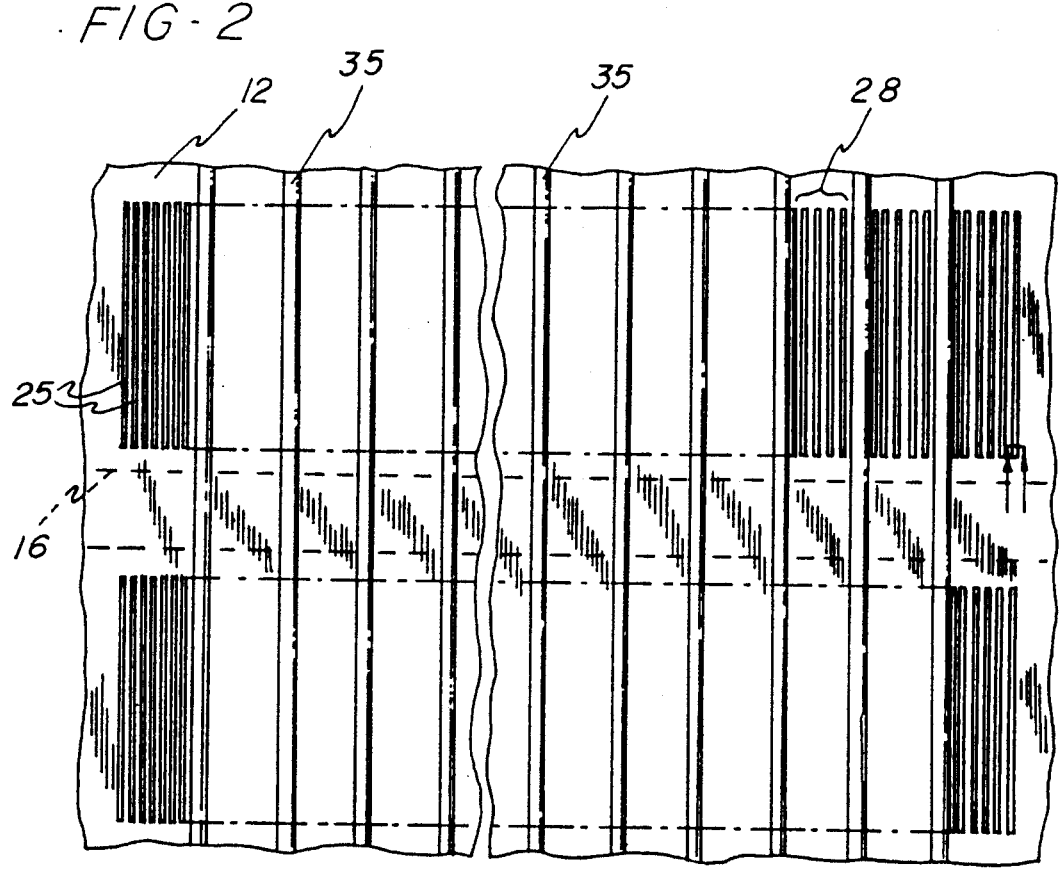
FIG. 2 is an enlarged fragmentary detail of a portion of the screen side wall after the slots have been cut and wear bars applied, looking at an inside surface.
Figure 4:
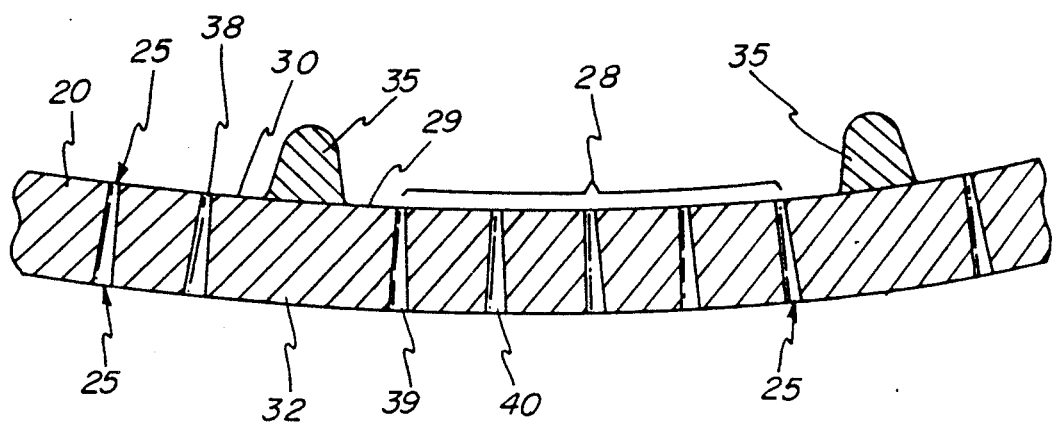
FIG. 4 is a fragmentary section through the side wall.

A side wall 20, as shown in FIGS. 2 and 4, is formed with a generally uniform thickness throughout, in the axial regions between the reinforcing rings and between one of the rings and its adjacent end ring 14 or 15. It will be understood that the exact configuration of the end rings is such as to permit the completed screen cylinder to be received within suitable high turbulence paper stock screening apparatus, of the general type as shown in Seifert, U.S. Pat. No. 3,849,302 issued Nov. 19, 1974 and the patent of Chupka and Seifert, U.S. Pat. No. 4,155,841, previously mentioned. Different models of such high pressure screening apparatus will obviously require different overall screen cylinder configurations, within the scope of this invention, and as such may or may not have end or intermediate rings, or may have rings of a particular shape.

Figure 3:
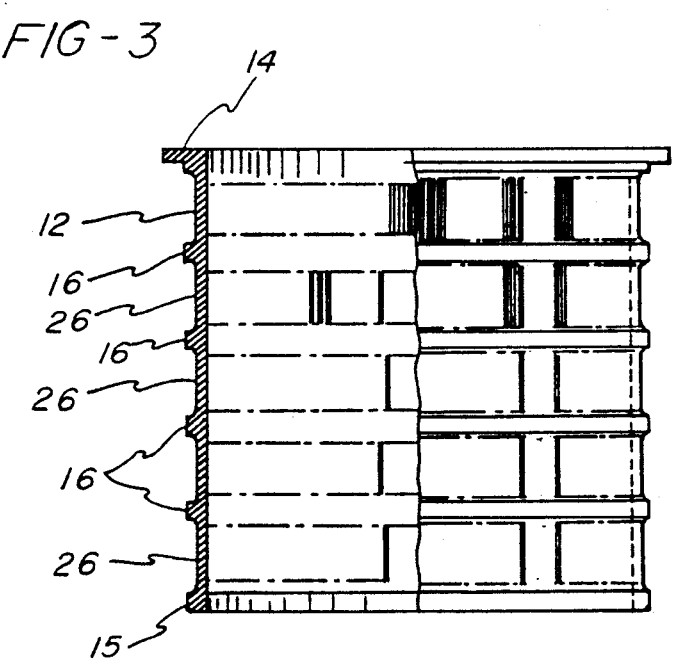
FIG. 3 is a view of a finished cylinder screen according to this invention, partially in section.

The body 10 as manufactured in accordance with this invention and as illustrated in FIGS. 1 and 3 is one which is free of any connecting seams and further is free of any rolled or bent parts which would have or which would induce residual stresses within the body. In fact, the body 10 is substantially free of internal stresses, is of a uniform grain structure throughout, and exhibits a high strength.

Openings, such as in the form of holes and/or slots, are formed in the wall 20 by laser cutting. The openings, illustrated by the slots 25, are formed in the annular flat spaces 26 (FIG. 3) defined between the ring 16. FIG. 1 illustrates the body 10 before the cutting of the openings 25 and represents a form of the invention which may be pre-manufactured and stored for subsequent cutting to a customer's specification. Since a customer's specifications may vary, the laser cutting technique of this invention, in combination with the wear bar application technique of this invention, provides a high degree of versatility in the meeting of specific customer requirements.

The cylinder body 10, as shown in FIG. 3, is formed with circumferential rows of generally axially oriented slots 25, the rows being positioned in the intermediate cylindrical side wall portions between the reinforcing rings 16. The slots 25 in each of the annular bands or rows are formed into individual slot groups 28 defining axially extending land areas 29 therebetween, as shown in FIG. 4. The individual slots 25, as shown, extend through the body portion through an inside inlet surface 30 to an outside or outlet surface 32, as shown in FIG. 4, in generally normal relation to these surfaces.

The intermediate land areas 29, between the groups 28 of slots, provide a convenient space for the application of turbulence inducing ribs or wear bars 35 on the inlet surface 20. The bars 35 may run the full height of the plate body 10 along the inside surface 30, on the land areas 29, and thus extend across the several annular rows of slots 25 in non-intersecting relation to the slots. Preferably, the wear bars 35 are spaced angularly about the body from each other and run in generally parallel relationship, axially of the inside surface, although it will be understood that the technique of applying the wear bars by the application of weld material directly to the inlet surface, permit the bars to be applied in other than straight line fashion and may be applied in curved regular or irregular patterns on such surface.

The wear bars 35 are preferably applied to the inside surface 30 at the lands 29 before the slots are cut through the body portion 20, and consist of weld beads which are applied directly to the surface, such as by a tig welder, and may consist of extremely hard cobalt-chromium-tungsten alloy. Such alloy is sold by Union Carbide & Chemical Corporation under the trade name "Stellite." The bars may be applied in a single pass or may be applied, one on top of the other, in two or more passes, to provide the desired elevation or thickness above the plate surface.

The forming methods provide an inside surface with a high degree of cylindrical accuracy, and permits the rotating foils to run closer to the inlet surface than heretofore possible, and thus makes possible the use of turbulence inducing bars 35 which may consist of a single pass or single layer of weld bead material applied to the surface. The application of the beads, by welding, results in minimum penetration of the depth of the material of the body portion 20 of the plate 10, and does not adversely affect the resistance of the overall cylinder against fatigue failures due to the fact that the major portion of the underlying grain structure is not effected by the application of the wear bars 35.

The individual openings, such as the slots 25, are formed by laser energy beam cutting, through the outlet surface 32 toward and into the inlet surface 30. While a $CO_2$ laser may be used, it is preferred to use a pulsed YAG laser, in which the beam is focused through the outlet or outer surface 32, and at a region adjacent and immediately inwardly of, the inner or inlet surface 30, with respect to the depth or thickness of the body portion 20. In this manner, since the beam enters the body from the outlet side and exits the body at the inlet side, and since the beam itself is focused substantially at the inlet side, the opening formed by the beam at the region of breakthrough at the inlet side is narrower than the opening formed at the outlet side. The extent of relief or taper is defined essentially by the convergence of the beam, with the result that the wall of the opening has a minimum of taper.

The methods of this invention has the advantage of permitting the formation of slots over a substantially wide range of slot widths, such as 0.002" or less up to 0.035" or more.

In a preferred embodiment, the slots 25 are formed by laser cutting from the outside or outlet surface 32 to the inlet surface 30. The critical dimension is that of the inlet opening or gap 38 of the individual slot 25, as shown in FIG. 4, which may, for example, be in the order of 0.010". Laser cutting of the slots provides a slot, in a 0.31" thickness plate, with an exit or outer opening 39 in the order of 0.025", defined by generally straight walls 40, thus retaining substantially more metal between adjacent slots than could be retained using conventional machining or slot-cutting apparatus. In this example, the total divergence of the walls is only in the order of 2.5°. It is understood that the invention is not limited to this specific example, and where desired, the inlet opening 38 may be smaller or larger than 0.010", and the exit opening 39 may be as wide as 0.040" or more. In the embodiment shown, the slots 25 are transversely spaced at a density of 6 to the inch, although it is obvious that a greater or fewer number of slots, either narrower or wider in transverse dimension may be formed, as desired.

In the cutting of the slot 25, as the laser beam burns through the cylinder wall, the cylinder and beam are moved with respect to each other in an axial direction, with reference to the axis of the cylinder, to form a slot in which the narrow end 38 of the slot opens at the inlet surface, and the wider end 39 of the slot opens at the outlet surface, as shown in FIG. 5.

The methods of this invention further have the advantage of permitting the accurate formation of holes or slots in the screen of widely varying width. For example, widths may be as narrow as 0.002" up to 0.35" or more, as desired for a particular screen.

As previously mentioned, the walls 40 of the openings are free of tool or machine marks. Thus, the invention has the particular utility in the manufacture of a screen in that the openings are characterized by walls which have an extremely smooth and hard surface, thereby enhancing the efficiency of the plate, whether the openings are in the form of holes or slots. This is due to the fact that, during the cutting steps, the surfaces of the walls which define the openings or slots are heated by the laser beam to the point where a very thin exposed wall layer 42 (shown with exaggerated thickness in FIG. 5) is momentarily heated to a molten state. As the laser beam passes, the wall layer 42 rapidly cools due to the mass of material and the thinness of the layer which has been molten. The resulting coalescence forms a "glassy" or recast outer or exposed surface 40 to the walls, which may undulate slightly, and which is very hard and totally free of tool marks. Thus, it has been found that these walls present a minimum of friction to the flow of stock therethrough with the result that the screen cylinder exhibits greater capacity as compared to cylinders in which the openings are conventionally cut or machined.

The laser cutting of the openings or slots through the wall 20 of the body 10 does not intend to induce any latent or inherent stresses and, on the contrary, the heating and cooling cycle of the material which immediately surrounds the opening, and which in fact forms the recast wall 42, is uniquely free of stress.

In view of the fact that the holes, openings or slots are formed by laser cutting, it will be appreciated that it is not necessary that the holes or slots be formed in truly normal relation to either the inside or outside surfaces of the plate, nor is it necessary that the slots be aligned either axially or circumferentially or that the slots run in straight lines. In fact, the techniques and methods of this invention permits the formation, in a screen cylinder, of one or more designs or patterns of slots to provide a unique and characteristic appearance and to provide slots which are at least in part inclined or sloping with respect to either an axial or a circumferential line. Thus, a screen cylinder 50 is illustrated in FIG. 6 in which the slots 52 are mutually inclined to each other and internested in a chevron-like pattern. Such a pattern can be formed simply by moving the screen plate in relation to the laser cutting tool as desired.

FIG. 7 shows a screen 54 in which the slots 55 are generally parallel to each other but are inclined to the axis of the screen plate, and the slots in each of the groups or rows may be, if desired, aligned with the slots in the adjacent group or row to provide a spiral-like appearance.

FIG. 8 provides a further example of the versatility of the invention in providing arcuately curved slots 60. Adjacent groups of slots 62 may be provided with a curvature in the opposite direction, if desired. The versatility which is provided not only permits slots to be optimized with respect to density and position, they may also be optimized in relation to the thickness of the cylinder all, taking into account the vector velocity of the stock slurry on either side of the cylinder. Further the slots may be formed into distinctive patterns which may have a product recognition value.

A particular advantage of the invention resides in the fact that the holes, openings, or slots need not always extend through the shortest distance between the opposite plate surfaces or, in other words, conventionally normal to the inside or outside surfaces. Heretofore, the use of conventional machining techniques has limited screens to openings which have centerlines which enter or exit essentially normal to a surface. However, particular advantages may be achieved by having one or more openings or slots, the centerlines of which are positioned other than normal to the surface or parallel to a radius line and, as noted above, a particular advantage of this invention resides in the fact that the slots may be inclined with respect to the thickness of the wall or to radius lines from the cylinder center. One such condition is illustrated in connection with the inclined slots 65 in the plate 68 of FIG. 9. Here, the slurry 70 is shown as swirling or rotating within and along the inside surface 30 of the cylinder with a direction as represented by the arrow 71. However, the slots, or some of them, may be oppositely inclined. Openings or slots which are forwardly inclined have the effect of increasing the extraction efficiency by decreasing the head across the cylinder, and have the advantage of providing a screen cylinder with higher efficiency.

The reverse oriented openings have the advantage of providing increased downstream cleanliness due to the superior ability of such openings to reject heavier and/or longer fibers and debris. Since the openings slant rearwardly or at an acute angle with respect to the direction of flow, any long or heavier fiber which enters the opening must first make a turn, with respect to the velocity vector, which turn may equal or exceed 90°, thereby making it more difficult for such a long or heavier reject to enter the opening. In appropriate circumstances, a given screen may, in accordance with this invention, be provided with openings or slots or combinations of the same, having combinations of inclinations or angles, to achieve a desired result. Also, combinations of slot groupings and patterns are possible.

It should also be understood that while this invention has been described in particular reference to a cylindrical screen for use in pressure screen apparatus for removing contaminant articles for papermakers' stock, the invention is not intended to be limited to such particular apparatus, and may be advantageously applied to other seamless screening apparatus in annular shapes.

The screen cylinder of this invention is one which is inherently less subject to premature fatigue failures as compared to the conventional fabricated cylinder using rolled components connected by weldments. Further, it is not susceptible to failures at welds since it is free of any connecting weld or seam between operable components.

While the methods herein described, and the forms of apparatus for carrying this method into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. The method of manufacturing a screen cylinder for use in removing contaminant particles from papermaking stock in which a metal cylinder body is formed with an intermediate cylindrical section, and in which a plurality of closely spaced screening slots are formed in said section, comprising the steps of:

centrifugally casting said body as an integral seamless unit free of internal stresses and forming said intermediate section, in the region of said slots, of generally uniform radial thickness throughout, thereby defining an inner surface and an outer surface, and forming said slots by directing a focused laser beam at said outer surface of said cylindrical section and relatively moving said body with respect to said beam, to form a slot with tapered walls of recast metal and free of machined stress concentration regions at the ends of the slots.

2. The method of claim 1 in which said cylinder body is formed with a pair of end rings and at least one reinforcing rib positioned on said outer surface axially intermediate said end rings, and in which said slots are formed in the spaces between said rib and said end ring.

3. The method of manufacturing a screen cylinder for use in removing contaminant particles from papermaking stock in which a metal cylinder body is formed with end rings and has an intermediate cylindrical section, and in which a plurality of closely spaced openings are formed in said section, comprising the steps of:

centrifugally casting said body as an integral seamfree unit free of internal stresses, in which said intermediate section is formed of material having a uniform radial thickness throughout, defining an inner surface and an outer surface, and forming a plurality of openings through said intermediate section leading from said inner surface to said outer surface by directing a focused laser beam at said outer surface while focusing said beam intermediate the outer and inner surfaces thereof and adjacent said inner surface to form a said opening with tapered walls of recast metal which are wider at said outlet surface than at said inlet surface.

4. The method of claim 3 including the further step of applying wear bars by applying beads of weld material to said inner surface in non-intersecting relation to said openings.

5. A screen cylinder for use in removing contaminant particles from papermaking stock, comprising:

a centrifugally cast seamless, generally cylindrical metal body having a section of uniform radial wall thickness, a plurality of closely spaced slots in said body section leading from an inner inlet surface to an outer outlet surface, said slots being defined by mutually tapered recast and generally parallel metal walls which are spaced closer together at said inlet surface than at said outlet surface.

6. The screen cylinder of claim 5 further having a plurality of wear bars formed on said inlet surface in non-intersecting relation to said slots, said wear bars being in the form of beads of weld material applied directly to said inlet surface.

7. A screen cylinder for use in removing contaminant particles from papermaking stock, comprising:
- a seamless centrifugally cast metal, generally cylindrical body,
- a first end ring on said body formed as an integral part of said body, a second end ring formed on the other end of said body as an integral part of said body, and at least one intermediate rib formed on said body, said body having an intermediate section having an inner inlet surface, an outer outlet surface, and defining a uniform wall thickness intermediate said end rings, and
- a plurality of closely spaced slots leading from said inner inlet surface to said outer outlet surface, said slots being defined by mutually tapered recast metal and generally parallel walls which are spaced closer together at said inlet surface than at said outlet surface.

8. The method of manufacturing a screen cylinder for use in removing contaminant particles from papermaking stock in which a metal cylinder body is formed with an intermediate cylindrical section and in which a plurality of closely spaced openings are formed in said section, comprising the steps of:
- cylindrically casting said body as an integral seamless metal unit free of internal stresses, and
- forming said openings in said intermediate section by directing a laser cutting beam generally radially against a surface of said cylindrical section to burn said openings therethrough, said openings being defined by walls formed of recast metal material.

9. A screen cylinder for use in removing contaminant particles from papermaking stock, comprising:
- a centrifugally cast seamless, generally cylindrical body formed of metal material having a pair of end rings and an intermediate section, and
- a plurality of closely spaced screening openings leading generally radially through said intermediate section, said openings defined by generally parallel walls formed of recast metal material.

* * * * *

UNITED STATES PATENT AND TRADEMARK OFFICE
CERTIFICATE OF CORRECTION

PATENT NO.  : 5,064,537

DATED       : November 12, 1991

INVENTOR(S) : David E. Chupka, Joseph P. Constiner and
              Christopher M. Vitori It is certified that error appears in the above-identified patent and that said Letters Patent is hereby corrected as shown below:

On the Title page, item [*] Notice: delete "January 31, 2006" and insert -- January 3, 2006 --.

Signed and Sealed this

Twenty-eighth Day of September, 1993

Attest:

BRUCE LEHMAN

*Attesting Officer*        *Commissioner of Patents and Trademarks*